(12) United States Patent
Novick

(10) Patent No.: US 9,613,050 B2
(45) Date of Patent: Apr. 4, 2017

(54) SHARED DATA STORAGE LEVERAGING DISPERSED STORAGE DEVICES

(71) Applicant: Maxta, Inc., Sunnyvale, CA (US)

(72) Inventor: Yoram Novick, Cupertino, CA (US)

(73) Assignee: Maxta, Inc., Sunnyvale, CA (US)

( * ) Notice: Subject to any disclaimer, the term of this patent is extended or adjusted under 35 U.S.C. 154(b) by 311 days.

(21) Appl. No.: 14/458,057

(22) Filed: Aug. 12, 2014

(65) Prior Publication Data

US 2015/0052179 A1    Feb. 19, 2015

Related U.S. Application Data

(60) Provisional application No. 61/865,302, filed on Aug. 13, 2013.

(51) Int. Cl.
*G06F 17/00* (2006.01)
*G06F 17/30* (2006.01)
*H04L 29/08* (2006.01)
*G06F 3/06* (2006.01)

(52) U.S. Cl.
CPC ........ *G06F 17/30203* (2013.01); *G06F 3/067* (2013.01); *G06F 3/0613* (2013.01); *G06F 3/0643* (2013.01); *G06F 3/0644* (2013.01); *G06F 17/30194* (2013.01); *H04L 67/1097* (2013.01)

(58) Field of Classification Search
CPC ........... G06F 9/45558; G06F 17/30174; G06F 17/30595; G06F 17/30575; G06F 17/30867
See application file for complete search history.

(56) References Cited

U.S. PATENT DOCUMENTS

2014/0149475 A1*    5/2014    Darcy ............... G06F 17/30283
                                                                707/827

* cited by examiner

*Primary Examiner* — Truong Vo
(74) *Attorney, Agent, or Firm* — Fenwick & West LLP

(57) ABSTRACT

A storage system provides shared storage by utilizing dispersed storage devices while optimizing both the placement of data across the dispersed storage devices and the method for accessing the stored data. The storage system enables high level of scalability and performance while minimizing resource consumption.

22 Claims, 6 Drawing Sheets

SHARED DATA STORAGE LEVERAGING DISPERSED STORAGE DEVICES

RELATED APPLICATIONS

This application claims the benefit of U.S. Provisional Patent Application No. 61/865,302 entitled "System and Method for Shared Data Storage Leveraging Dispersed Storage Devices," to Yoram Novick, filed on Aug. 13, 2013 which is incorporated by reference herein in its entirety.

BACKGROUND

Technical Field

The present invention relates to data storage and, more specifically, to providing shared data storage utilizing dispersed storage devices.

Description of the Related Art

For various reasons, it may be desirable to facilitate sharing of stored data among a plurality of servers in a computing environment. For example, data sharing is highly desirable in virtualized servers environments. In a virtualized server environment, server virtualization techniques are leveraged to improve the cost, agility, availability and scalability of a computing environment. Server virtualization enables multiple virtual machines, each executing its own operating system, to run on a single server. Data sharing across the servers in a virtualized environment leverages many of the benefits of server virtualization including migration of virtual machines across servers, dynamic load balancing, high availability and disaster recovery. However, conventional data sharing solutions such as solutions based on networked storage, Virtual Storage Appliance (VSA), and distributed file-system lack the scalability, performance, and cost desirable for virtualized or other shared storage computing environments.

SUMMARY

A computer-implemented method enables shared storage service in a computing environment comprising a plurality of servers each having a local storage pool comprising one or more locally accessible storage devices, the local storage pools collectively forming a global storage pool available to the plurality of servers.

In a first embodiment, an instruction is received from a first server to create a file in the global storage pool for the plurality of servers. A number of file images to create for the file in the global storage pool is determined based on first optimization criteria. A set of one or more local storage pools is selected to store the file images based on second optimization criteria. For each of the selected set of local storage pools, a file image is created for the file. A file image map is updated to store an association between the file and the selected set of one or more local storage pools that store the file images.

In another embodiment, a request is received to read data from the file. Based on the file image map, the set of local storage pools storing the file images of the file is determined. A target local storage pool is selected from the set of local storage pools based on third optimization criteria. The data is read from the file image stored to the target local storage pool. Metadata is updated to record a read operation between the requesting server and the selected local storage pool.

In yet another embodiment, a method relocates files in order to optimize placement of existing files in the shared storage system. A most requesting server is determined for a file that requests a largest number of access operations (which can include read operations, write operations, or both) associated with the file over a predefined time period from among a first plurality of servers that do not store an image of the file in their local storage pool. A least requesting server is also determined for the file that requests a smallest number of access operations associated with the file over the predefined time period from among a second plurality of servers that store an image of the file in their local storage pool. A difference value is determined representing a difference between a first value and a second value, the first value representing a count of the access operation between the most requesting server and the file, and the second value representing a count of the access operations between the least requesting server and the file. The difference value is compared to a threshold value. Responsive to the difference value exceeding the threshold value, the file is moved from a local storage pool of the least requesting server to a local storage pool of the most requesting server.

In other embodiments, a non-transitory computer readable storage medium stores instructions that when executed by one or more processors carries out the methods described above. In yet further embodiments, a computing system is configured to perform one or more the methods described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION

Figure 1:
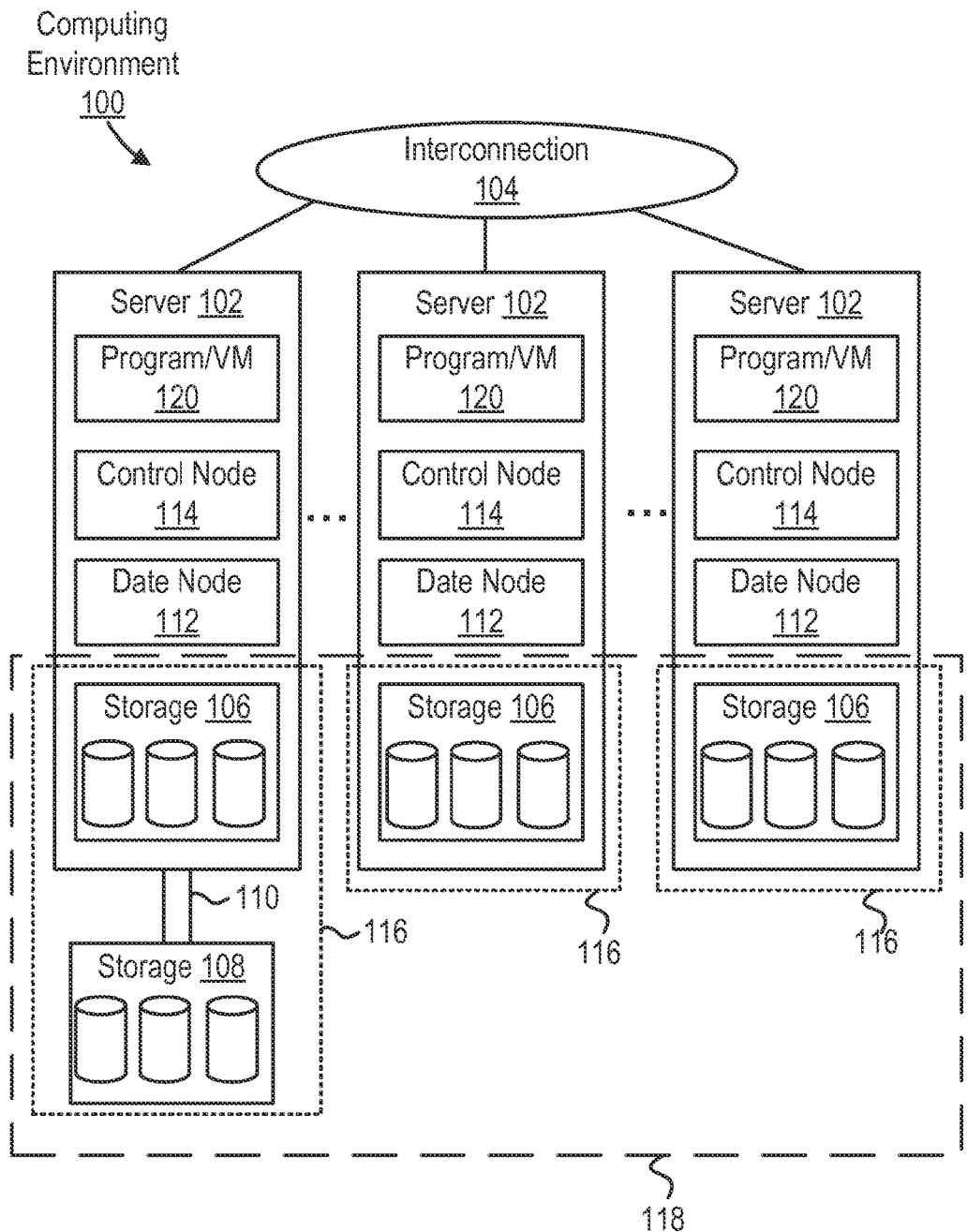
FIG. 1 is a simplified illustration of a computing environment in accordance with an embodiment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

The disclosed embodiments include a system, method, and non-transitory computer-readable storage medium for utilizing dispersed storage devices in a peer-to-peer architecture that facilitates shared storage in a computing environment. The computing environment includes a plurality of servers each having a locally accessible storage pool that contributes to the global storage pool available to the servers. The disclosed embodiments optimize both the placement of data across the dispersed storage devices and the method for accessing the stored data to enable high level of scalability and performance and to minimize resource consumption.

The placement of file images across local storage pools can be optimized during file creation to increase the probability that an image of the file exists in the server issuing a read or write to that file. In addition, over time, images of files can be moved or copied across local storage pools to increase the probability that an image of the file exists in the server issuing a read or write to that file even further. Such an optimization technique enables multiple servers to issue multiple read and write operations to multiple files concurrently without any bottlenecks thereby providing unlimited scalability. Additionally, this technique increases the usage of intra-server bandwidth in lieu of inter-server bandwidth and reduces the need for utilizing two servers rather than one in serving a read operation thereby avoiding the performance problems associated with accessing a file image that is not stored on the server issuing the operation. In other embodiments, different optimization criteria are used to provide optimal file placement in a shared storage environment.

Reference is now made to FIG. 1, which is a simplified illustration of an embodiment of a computing environment 100. As seen in FIG. 1, the computing environment 100 comprises at least one server 102. The servers 102 may be interconnected via interconnection 104, such as a local area network (LAN) to enable communication among them. A server 102 may include one or more storage devices 106 located within the server and/or one or more storage devices 108 located outside the server 102 and directly attached to the server 102 (i.e., without a network-based connection) via an interconnection 110, such as Serial-Attached Small Computer System Interface (SAS) or Serial Advanced Technology Attachment (SATA). The storage devices 106, 108 can be implemented by any type of storage technology or by a combination of storage technologies. For example, magnetic disk drive technology, solid state drive technology, or a storage system combining multiple storage devices using multiple storage technologies can be used for implementing the storage devices 106, 108. At least one server 102 comprises a $1^{st}$ instance of a computer program module, illustratively embodied as data node 112. At least one server 102 comprises a $2^{nd}$ instance of a computer program module, illustratively embodied as control node 114. Each server 102 in the computing environment may be running (a) a data node 112 only or (b) a control node 114 only or (c) both data node 112 and control node 114 or (d) neither a data node 112 nor a control node 114. A single computer program module can act as both a data node 112 and a control node 114 at the same time.

In an embodiment, control nodes 114 and data nodes 112 can be implemented as one or more processors (which may also be used by other components of the server 102) and a non-transitory computer-readable storage medium that stores instructions that when executed by the one or more processors carries out the functions attributed to the control nodes 114 and data nodes 112 respectively as described herein.

The data node 112 may manage some or all of the storage devices 106 within its hosting server 102 and some or all of the storage devices 108 attached to its hosting server 102. The aggregation of the managed storage devices is illustratively embodied as a local storage pool 116 which represents storage locally accessible to a given server 102. The control node 114, in cooperation with the other control nodes 114, if more than one control node 114 exists in the computing environment 100, create and manage a single name space and a single pool of storage, global storage pool 118 that is composed of some or all of the local storage pools 116. When an operation requires an action from a control node 114, any control node 114 in any server 102 can be invoked to perform the operation since all control nodes 114 work in cooperation. The global storage pool 118 acts as a data repository for computer programs and virtual machines and stores, for example, file data used by the various computer programs and virtual machines. In addition to being a data repository, global storage pool 118 maintains metadata to manage the data repository and information and statistics about the usage of the various local storage pools 116 for various operations such as read or write operations.

When a file is stored in the global storage pool, one or more images of the file are stored in one or more local storage pools. An image of a file can be stored either in a single local storage pool or across multiple local storage pools.

Servers 102 also store various computer programs and or virtual machines (VM) embodied as a non-transitory computer-readable storage medium storing instructions executable by one or more processors. Each computer program or virtual machine (VM) 120 executing within every server 102 in the computing environment 100 can have access to the entire global storage pool 118 and can create and delete files from it and read and write to any of the files stored in it.

Figure 2:
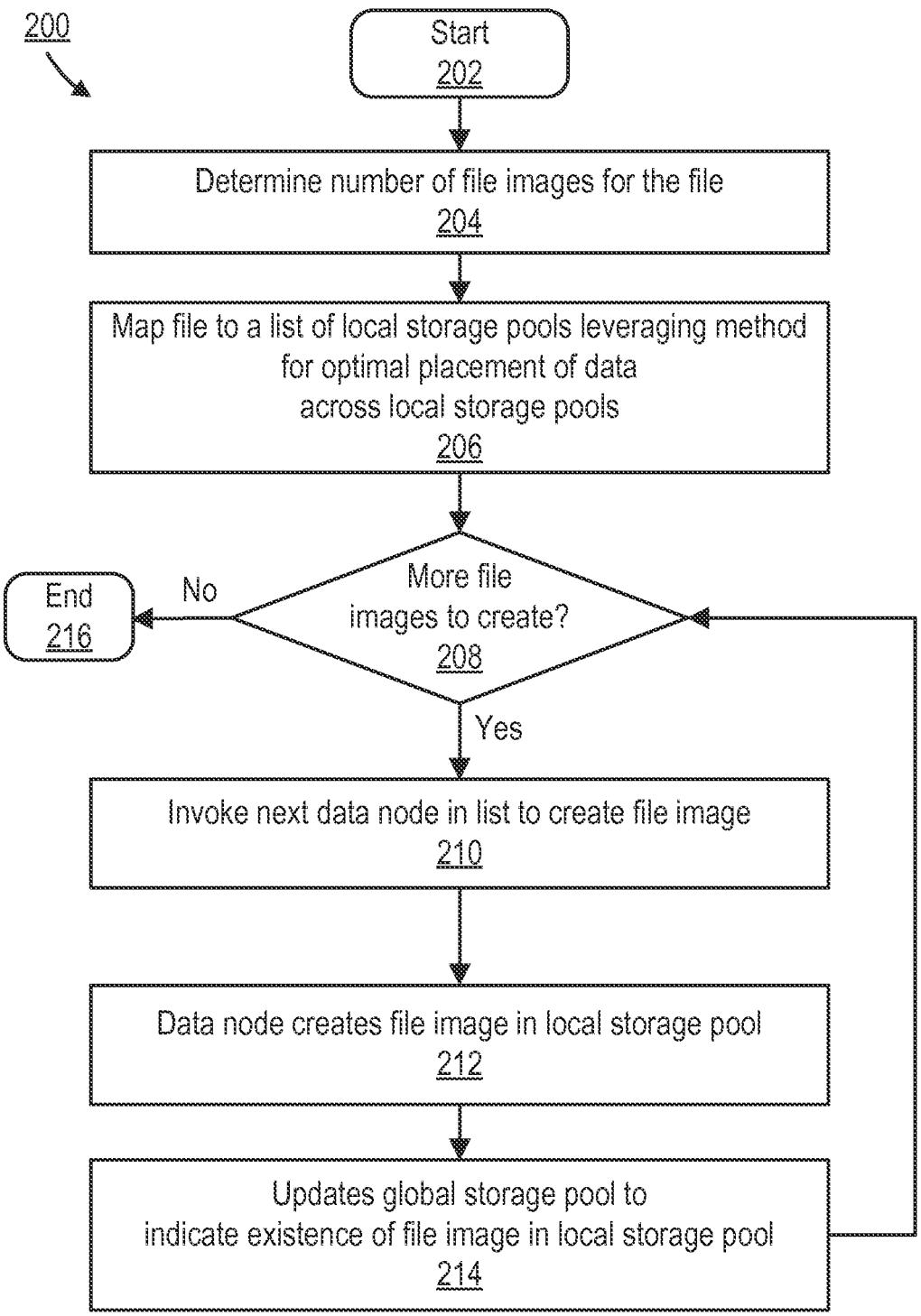
FIG. 2 is a simplified illustration of a flow diagram of an exemplary method for creating a file in a computing environment in accordance with an embodiment.

FIG. 2 is a flow diagram of an exemplary method 200 for creating a file in the global storage pool 118. The exemplary method 200 begins at 202. At 204, a control node 114 is invoked to determine how many file images should be created for the file based on a policy or optimization criteria. The number of images can be based upon a policy that determines the level of availability, performance, and cost required for the file. For example, if storage cost is the main criteria, one or two images of the files could be the appropriate number. If on the other hand, the file should be able to survive multiple server failures (e.g., high availability) or it requires high performance, three or more images could be more appropriate. In an embodiment, the determination can be made on a file-by-file basis depending on various characteristics of the file and the state of the computing environment 100. For example, in one embodiment, a file that is deemed high importance may have a higher number of file images than a file that is deemed less critical. In another embodiment, a different number of images may be created for different file types or files created by different applications. In yet another embodiment, the number of file images can change over time depending on available storage capacity or other state information.

At 206, the control node 114 is invoked to map the file to be created to a list of local storage pools 116 that will encompass the file images of the file. In one embodiment, each image of a file is stored entirely in a single local storage pool 116. In this embodiment, the number of local storage pools 116 in the list is the number determined at step 204. A method is used to optimize data placement across local storage pools 116 by selecting the optimal local storage pools 116 for the file images based on various optimization criteria. The method can use multiple factors and any combination of them to determine the optimal local storage pools 116. For example, the local storage pool 116 residing in the server 102 that is issuing the create file operation can be selected since in most computing environments it is likely that a relatively large number of future subsequent operations to the file will be issued from the server 102 creating the file. Therefore, the usage of intra-server data transfer is increased in lieu of inter-server data transfer thereby avoiding the scalability and performance problems associated with inter-server data transfer. In another example, the method can keep track of the workload experienced (e.g., number of read and write operations) in each one of the servers 102 and select the local storage pools 116 residing in the servers having the lowest workload level. In another embodiment, the selection may be based on available capacity of the different storage pools 116 (e.g., by selecting storage pools 116 with the highest available capacity). In another embodiment, the placement of files may be based on the relative compute power of the associated server 102. In another embodiment, the placement of files may be based on a prediction of which application is most likely to read and/or write to the file (e.g., by selecting local storage pools 116 locally attached to servers 102 executing the applications most likely to access the file). In yet another embodiment, the placement of files may be based on the access time of the servers 102 (e.g., by placing files that require the highest performance in local storage pools 116 associated with the highest performing server). In an embodiment, the criteria for selecting the local storage pools 116 to store the file can furthermore be based on characteristics of the file itself including a file type. For example, email files may be treated differently than image files. In other additional embodiments, placement of files may be based on a combination of one or more of the above-described factors.

In another embodiment, each file image is not stored entirely in one local storage pool 116 and is instead striped across multiple local storage pools 116. In this embodiment, step 206 may furthermore include determining, for each file image, how many local storage pools 116 will be used to collectively store the striped file image, and how the file image will be striped across the local storage pools 116. The "striping factor," referring to the number of local storage pools 116 across which a given file image is striped, may be different than the "copy factor," referring to the total number of file images for the file. The total number and specific selection of local storage pools 116 for striping a file image can be determined based on similar factors to those discussed above such as, for example, which server is creating the file, the workloads of the server, the type of file, etc.

At 208, the control node 114 determines whether more images of the file should be created based upon the list generated at 206. If all images of the file have been created, the exemplary method ends at 216.

If more images of the file should be created based on the list generated at 206, the data node 112 corresponding to the next local storage pool 116 (or set of local storage pools 116 if data striping is applied) in the list is invoked at step 210. At 212, each data node 112 creates the file image (or portion of the file image) in its local storage pool 116. At 214, the control node 114 updates a file map stored as metadata in the global storage pool 118 to reflect the fact that an image of the file exists in the one or more local storage pools 116 that was used in step 212. For example, the file map stores an association between the file and the one or more local storage pools 116. The processing of the method resumes at step 208.

In one embodiment, the number, placement, and manner of striping file images is not necessarily fixed and may change over time based on any of the optimization criteria discussed above. For example, based on changing operating conditions, file images may be added, removed, moved, or re-striped.

Figure 3:
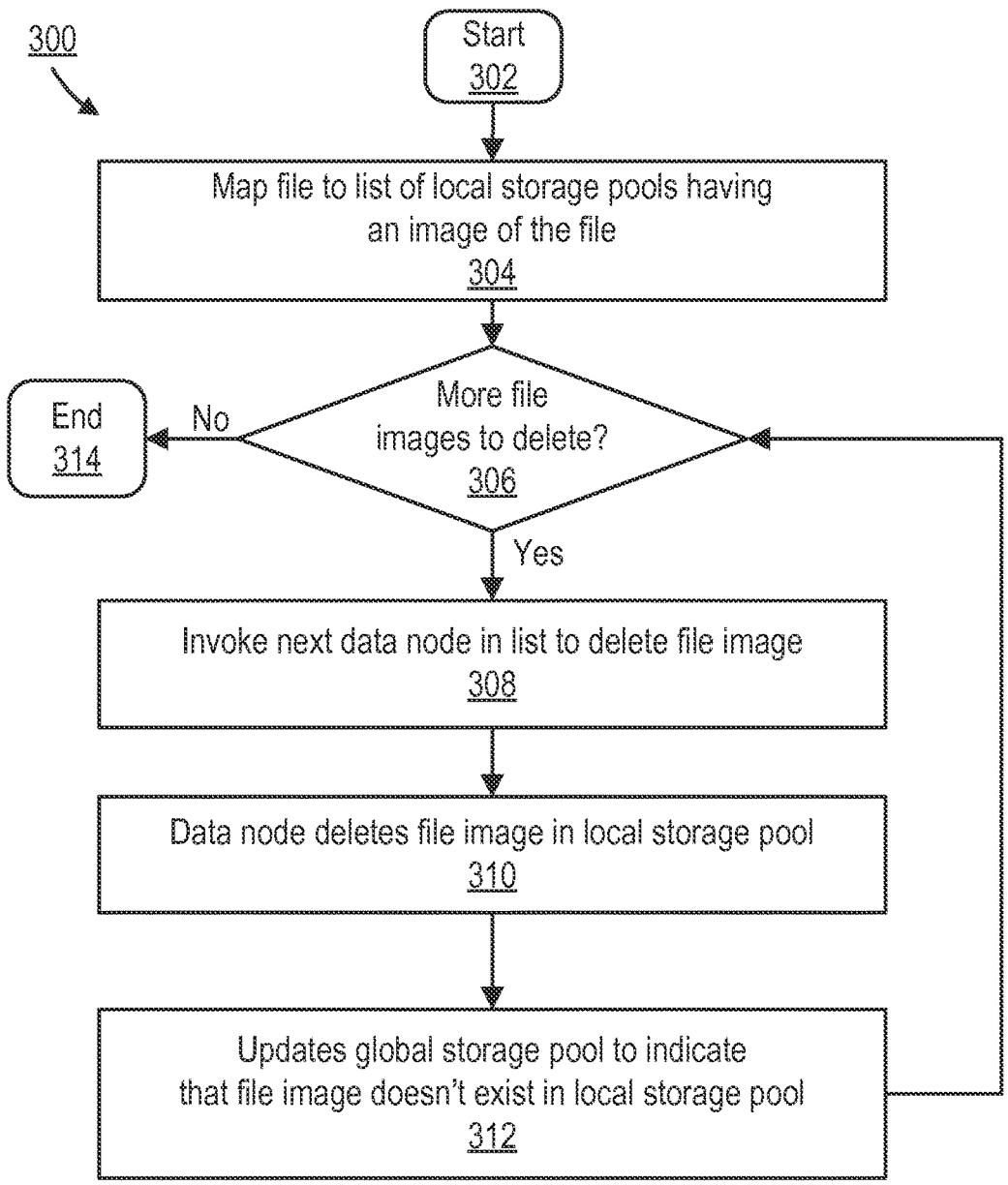
FIG. 3 is a simplified illustration of a flow diagram of an exemplary method for deleting a file in a computing environment in accordance with an embodiment.

FIG. 3 is a flow diagram of an exemplary method 300 for deleting a file in the global storage pool 118. The exemplary method 300 begins at 302. At 304, a control node 114 is invoked to map the file to be deleted to the list of local storage pools 116 containing an image of the file based on information stored in a file map as metadata in the global storage pool 118. At 306, the control node 114 determines whether more images of the file should be deleted based upon the list generated at 304. If all images of the file have been deleted, the exemplary method 300 ends at 314.

If more images of the file should be deleted based upon the list generated at 304, the data node 112 corresponding to the next local storage pool in the list is invoked at step 308. The data node 112 deletes the file image in its local storage pool 116 at 310. At 312, the control node 114 updates the file map stored as metadata in the global storage pool 118 to record a delete operation and to reflect the fact that an image of the file does not exist anymore in the local storage pool 116 that was used in step 310. The processing of the method resumes at step 306. In this case, where file images are striped across multiple local storage pools 116, the process of FIG. 3 may be modified so that each data node 112 is invoked to delete respective portions of the striped file image that it manages in its local storage pool 116.

Figure 4:
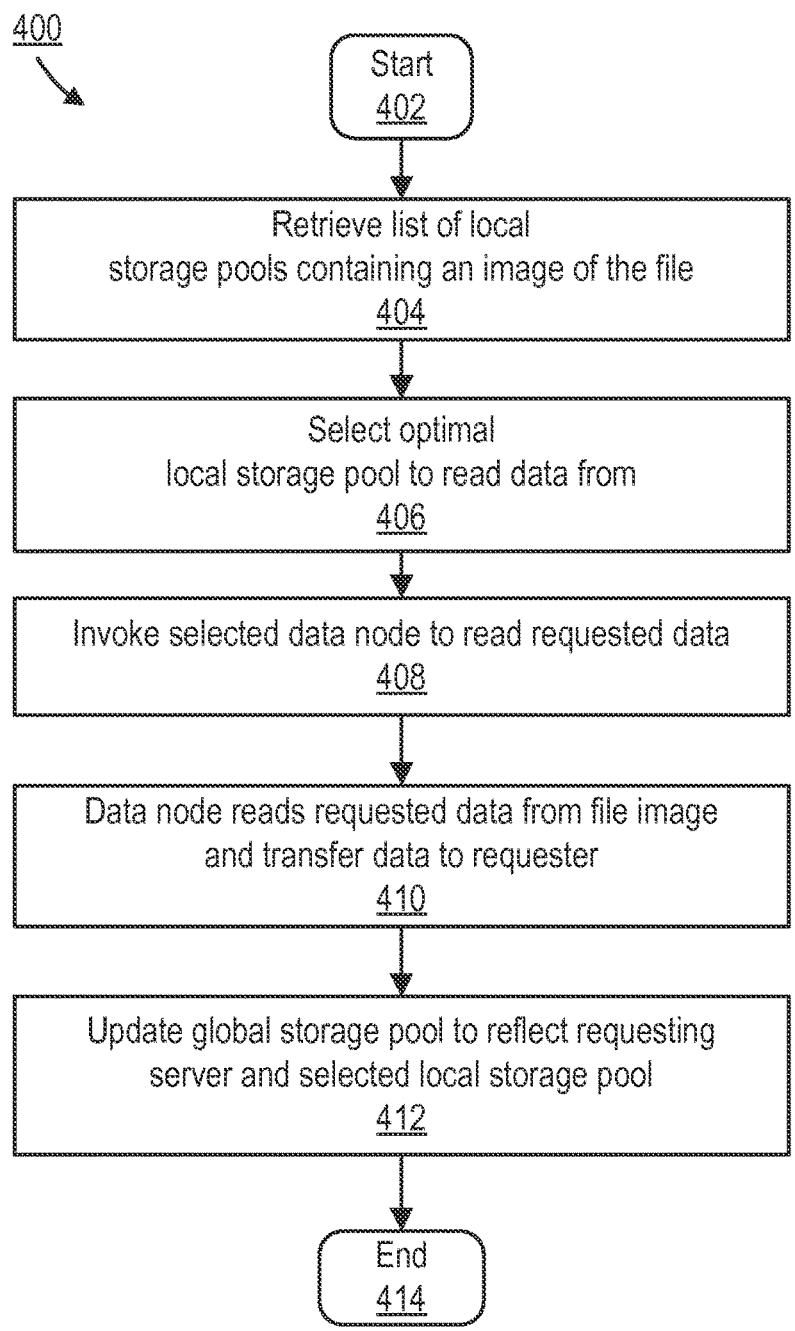
FIG. 4 is a simplified illustration of a flow diagram of an exemplary method for reading data from a file in a computing environment in accordance with an embodiment.

FIG. 4 is a flow diagram of an exemplary method 400 for reading data from a file in the global storage pool 118. The exemplary method 400 begins at 402. At 404, a control node 114 is invoked to retrieve the list of local storage pools that contain an image of the file based on a file map stored as metadata in the global storage pool 118.

At 406, the control node 114 selects the optimal local storage pool 116 for reading data from the list of local storage pools retrieved at step 404 based on various optimization criteria. The method can use multiple factors and any combination of them to determine the optimal local storage pool for reading the file. For example, in one embodiment, if an image of the file exists in the local storage pool 116 residing in the server 102 issuing the read operation, the local storage pool 116 of that server 102 is selected. Therefore, the usage of intra-server data transfer is increased in lieu of inter-server data transfer thereby avoiding the scalability and performance problems associated with inter-server data transfers. In another example, the method keeps track of the workload level for each of the servers 102 containing an image of the file and/or the workload level experienced by the corresponding data node 112 and selects the server 102 with the lowest workload level. In yet another embodiment, the selected local storage pool 116 for accessing the file may be based on the access time (e.g., by selecting the local storage pool 116 that provides the fastest access time under the current network conditions). In an embodiment, the criteria for selecting the local storage pools 116 to read the file can furthermore be based on characteristics of the file itself including a file type.

At 408, the control node 114 invokes the data node 112 managing the selected local storage pool 116 to read requested data. At 410, the data node 112 reads requested data from the file image and transfers the data to the requester.

At 412, the control node 114 updates metadata in the global storage pool 118 to identify the server originating the read operation and the local storage pool 116 selected for serving the read operation. For example, the control node 114 records a read operation by storing an association between the server 102 and the selected local storage pool 116. This information can be used for various optimization tasks. For example, this information can be used to determine a local storage pool 116 to read data from for a future read operation in a future execution of step 406. In another example, this information can be used for deciding whether to move a file image from one local storage pool 116 to another. An exemplary method describing this task is given in FIG. 6. The exemplary method 400 ends at 414.

In alternative embodiments in which file images are striped across multiple local storage pools 116, the process of FIG. 4 may be modified so that the selection of which file image to read is based on optimization criteria corresponding to the combination of local storage pools 116 and/or associated servers 102 storing the striped file image.

Figure 5:
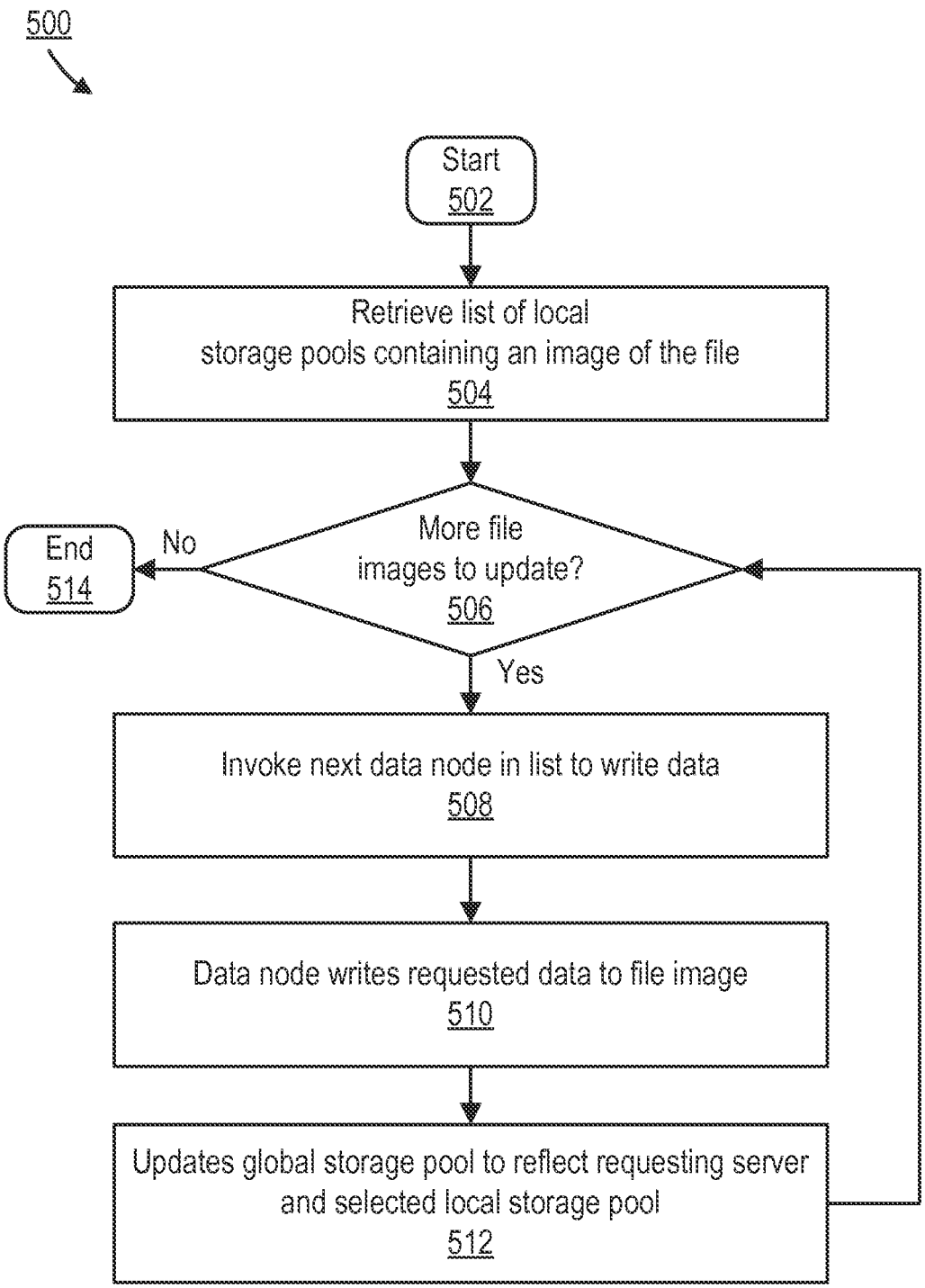
FIG. 5 is a simplified illustration of a flow diagram of an exemplary method for writing data to a file in a computing environment in accordance with an embodiment.

FIG. 5 is a flow diagram of an exemplary method 500 for writing data to a file in the global storage pool 118. The exemplary method 500 begins at 502. At 504, a control node 114 is invoked to retrieve the list of local storage pools 116 that contain an image of the file based on a file map stored as metadata in the global storage pool 118.

At 506, the control node 114 determines whether more images of the file should be updated based upon the list retrieved at 504. If all images of the file have been updated, the exemplary method 500 ends at 514.

If more images of the file should be updated based on the list retrieved at 504, the data node 112 corresponding to the next local storage pool 116 in the list is invoked at 508. The data node writes the requested data to the file image in its local storage pool 116 at 510.

At 512, the control node 114 updates metadata in the global storage pool 118 to identify the server originating the write operation and the fact that an image of the file was updated in the respective local storage pool 116. This information can be used for various optimization tasks. For example, this information can be used to determine whether to move a file image from one local storage pool 116 to another. An exemplary method describing this task is given in FIG. 6. Processing of the method resumes at step 506.

In alternative embodiments in which file images are striped across multiple local storage pools 116, the process of FIG. 5 may be modified so that data is appropriately written to the relevant striped portion of each file image by its respective data node 112.

Figure 6:
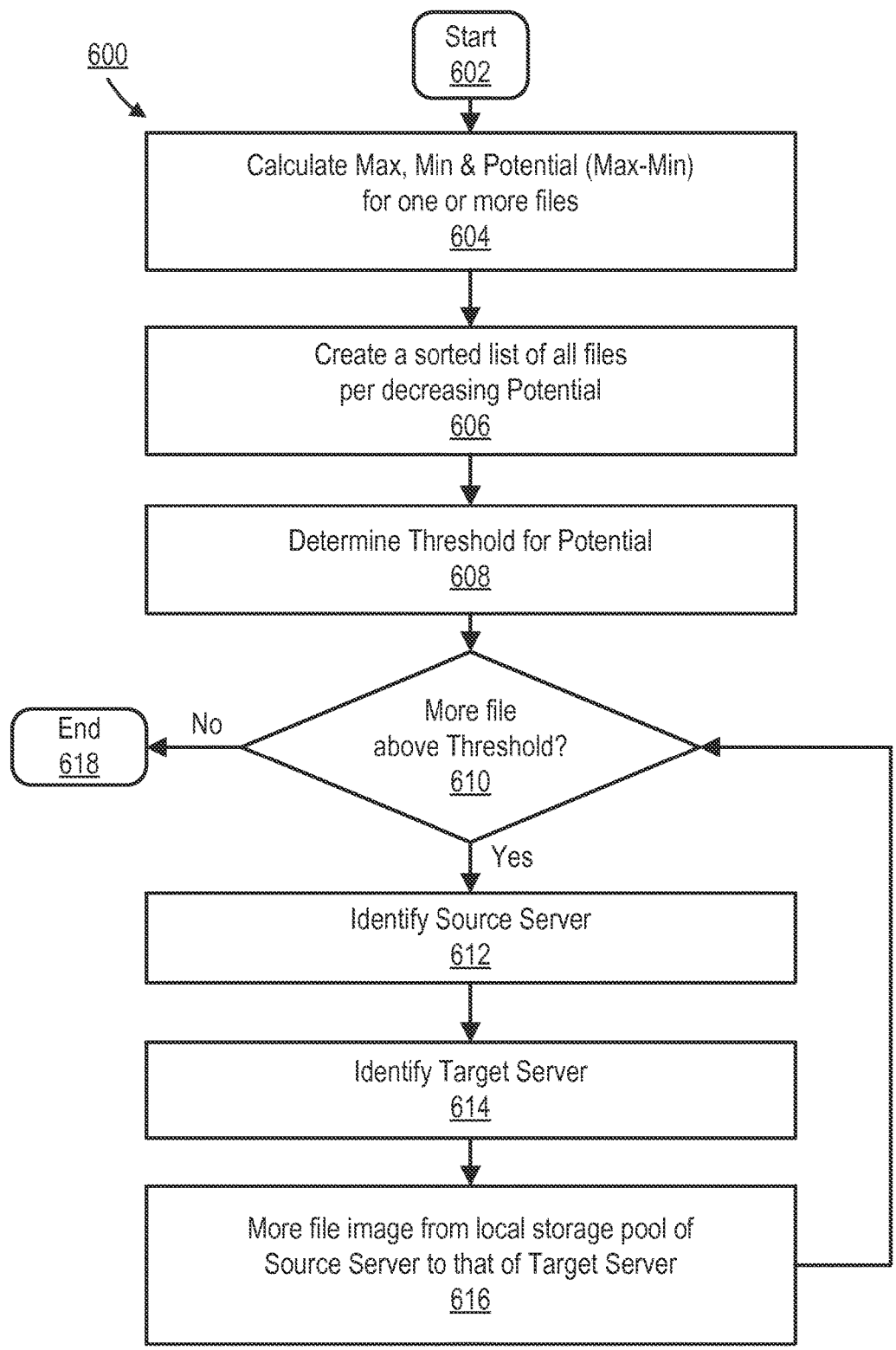
FIG. 6 is a simplified illustration of a flow diagram of an exemplary method for optimizing the placement of files in a computing environment in accordance with an embodiment.

FIG. 6 is a flow diagram of an exemplary method 600 for optimizing the placement of files images across the local storage pools 116. In one embodiment, this method is performed periodically or when a particular condition is met in order to re-distribute file images to improve performance. The exemplary method 600 begins at 602. At 604, a set of properties are calculated for one or more files in the global storage pool 118. In various embodiments, step 604 may be performed only for a single file, for a target subset of files, or for all the files in the global storage pool 118. In this step, a most requesting server for a given file is determined from among the set of servers 102 that do not store an image of the file in their respective local storage pools. In one embodiment, the most requesting server is the server that requests the largest number of read and/or write operations issued to the file over some period of time from among the servers that do not have an image of the file in their respective local storage pools 116. The number of read and/or write requests for the file from the most requesting server is denoted as "Max" herein. A least requesting server is also determined from among the set of servers 102 that have an image of the file in their respective local storage pools. For example, the least requesting server is the server that requests the smallest number of read and/or write operations issued to the file over some period of time (e.g., same period of time as used for determining the most requesting server) from among the servers that have an image of the file in their respective local storage pools 116. The number of read and/or write requests for the file from the least requesting server is denoted as "Min" herein. A difference value (denoted "Potential" herein) is also determined that represents a difference between Max and Min.

At 606, a sorted list of the files is created such that the list is sorted per Potential of each file in a decreasing order. At 608, a threshold parameter, "Threshold," is determined to ensure that movement of file images is performed only for cases where the cost of moving the file image is justified by the expected gain in improved efficiency due to the movement. Specifically, if the pattern of read and write operations in the future is expected to be similar to that of the past, the higher the threshold, the higher the potential of improved efficiency due to the movement. The threshold parameter may be determined based on the distribution of Potential in the sorted list. For example, Threshold may be set based on the median value of Potential, mean value of Potential, a percentile of Potential, etc.

In an alternative embodiment, the threshold parameter may be determined based on file type, capacity of various local data nodes, or other parameters.

At 610, Potential for the next file or set of files in the list created at 606 is compared to Threshold. If Potential is not higher than Threshold, no more files in the list have Potential higher than Threshold and the exemplary method 600 ends at 618. Otherwise, the method proceed to step 612.

At 612, a Source Server 102 is identified. In one embodiment, the Source Server is the least requesting server described above that (a) has an image of the file in its local storage pool 116 and (b) issued Min number of read and write operations to the file. At 614, a Target Server 102 is identified. In one embodiment, the Target Server is the most requesting server described above that (a) does not have an image of the file in its local storage pool 116 and (b) issued Max number of read and write operations to the file. At 616, the file image of the file residing in the local storage pool 116 of the Source Server 102 is moved to the local storage pool 116 of the Target Server 102 and processing of the method resumes at step 610 to process additional files.

Upon reading this disclosure, those of skill in the art will appreciate still additional alternative embodiments having the features described herein. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the scope of the invention defined in the appended claims.

The invention claimed is:

1. A computer-implemented method for shared storage service in a computing environment comprising a plurality of servers each having a local storage pool comprising one or more locally accessible storage devices, the local storage pools collectively forming a global storage pool available to the plurality of servers, the method comprising:
- receiving from a first server, an instruction to create a file in the global storage pool for the plurality of servers;
- determining a number of file images to create for the file in the global storage pool based on at least one of: a type of the file, an application associated with the file, a desired availability level for the file, a desired performance level associated with accessing the file, and a cost associated with accessing the file;
- selecting a set of one or more local storage pools to store the file images, the set of one or more local storage pools selected based on first optimization criteria;
- for each of the selected set of local storage pools, creating a file image for the file; and
- updating a file image map to store an association between the file and the selected set of one or more local storage pools that store the file images.

2. The computer-implemented method of claim 1, wherein selecting the set of one or more local store pools based on the first optimization criteria comprises:
- selecting a first local storage pool locally accessible to the first server; and
- selecting one or more additional local storage pools based on a workload history of the plurality of local storage pools.

3. The computer-implemented method of 1, wherein selecting the set of one or more local storage pools based on the first optimization criteria comprises:
- selecting the set of one or more local storage pools based on at least one of: a workload associated with the plurality of local storage pools, available capacity of the plurality of local storage pools, relative computing power of the servers associated with the plurality of local storage pools, an access time of the servers associated with the plurality of local storage pools, a prediction of an application most likely to read or write to the file, a characteristic of the file, and a type of the file.

4. The computer-implemented method of claim 1, wherein creating the file image for the file comprises:
- determining a number of local storage pools to stripe each file image across based on at least one of: a type of the file, an application associated with the file, a desired availability level for the file, a desired performance level associated with accessing the file, and a cost associated with accessing the file;
- selecting a group from the local storage pools to stripe each file image across based on at least one of: a workload associated with the local storage pools, available capacity of the local storage pools, relative computing power of the servers associated with each of the local storage pools, an access time of the servers associated with each of the local storage pools, a prediction of an application most likely to read or write to the file, a characteristic of the file, and a type of the file; and
- striping the file image across the selected group.

5. The computer-implemented method of claim 1, further comprising:
- receiving, from a requesting server, a request to read data from the file;
- identifying, based on the file image map, the set of local storage pools storing the file images of the file;
- selecting a target local storage pool from the set of local storage pools based on second optimization criteria;
- reading the data from the file image stored on the target local storage pool;
- updating metadata to record a read operation between the requesting server and the selected local storage pool.

6. The computer-implemented method of claim 5 wherein selecting a target local storage pool from the set of local storage pools based on the second optimization criteria comprises:
- selecting the targeting local storage pool based on at least one of: local accessibility to the requesting server of the local storage pools having the file image, a workload of the local storage pools having the file image, an access time to the file image associated with the local storage pools having the file image, a characteristic of the file, an application associated with the file, and a file type of the file.

7. The computer-implemented method of claim 1, further comprising:
- receiving a request from a requesting server to write data to the file;
- identifying, based on the file image map, the set of local storage pools storing the file images of the file;
- writing the data to all respective local storage pool; and
- updating metadata to record a write operation between the requesting server and each of the set of local storage pools having the file images for the file.

8. The computer-implemented method of claim 1, further comprising:
- receiving a request from a requesting server to delete the file;
- identifying, based on the file image map, the set of local storage pools storing the file images of the file;
- deleting the file from all respective local storage pool; and
- updating metadata to record a delete operation between the requesting server and each of the set of local storage pools having the file images for the file.

9. The computer-implemented method of claim 1, further comprising:
- determining, for a file, a most requesting server requesting a largest number of access operations associated with the file over a predefined time period from among a first plurality of servers that do not store an image of the file in their local storage pool, wherein the access operations comprise at least one of read operation and write operations;
- determining, for the file, a least requesting server requesting a smallest number of the access operations associated with the file over the predefined time period from among a second plurality of servers that store an image of the file in their local storage pool;
- determining a difference value representing a difference between a first value and a second value, the first value representing a count of the access operation between the most requesting server and the file, and the second value representing a count of the access operations between the least requesting server and the file;
- comparing the difference value to a threshold value; and
- responsive to the difference value exceeding the threshold value, moving the file image from a local storage pool of the least requesting server to a local storage pool of the most requesting server.

10. The computer-implemented method of claim 9, further comprising:
- generating a sorted list of a plurality of files based on respective difference values; and determining the threshold value based on at least one of a median value of the respective difference values, a mean value of the respective difference values, and a percentile of the respective difference values.

11. A non-transitory computer-readable storage medium storing instructions for shared storage service in a computing environment comprising a plurality of servers each having a local storage pool comprising one or more locally accessible storage devices, the local storage pools collectively forming a global storage pool available to the plurality of servers, the instructions when executed by one or more processors causing the one or more processors to perform steps including:
receiving from a first server, an instruction to create a file in the global storage pool for the plurality of servers;
determining a number of file images to create for the file in the global storage pool based on at least one of: a type of the file, an application associated with the file, a desired availability level for the file, a desired performance level associated with accessing the file, and a cost associated with accessing the file;
selecting a set of one or more local storage pools to store the file images, the set of one or more local storage pools selected based on first optimization criteria;
for each of the selected set of local storage pools, creating a file image for the file; and
updating a file image map to store an association between the file and the selected set of one or more local storage pools that store the file images.

12. The non-transitory computer-readable storage medium of claim 11, wherein selecting the set of one or more local store pools based on the first optimization criteria comprises:
selecting a first local storage pool locally accessible to the first server; and
selecting one or more additional local storage pools based on a workload history of the plurality of local storage pools.

13. The non-transitory computer-readable storage medium of claim 11, wherein selecting the set of one or more local storage pools based on the first optimization criteria comprises:
selecting the set of one or more local storage pools based on at least one of: a workload associated with the plurality of local storage pools, available capacity of the plurality of local storage pools, relative computing power of the servers associated with the plurality of local storage pools, an access time of the servers associated with the plurality of local storage pools, a prediction of an application most likely to read or write to the file, a characteristic of the file, and a type of the file.

14. The non-transitory computer-readable storage medium of claim 11, wherein creating the file image for the file comprises:
determining a number of local storage pools to stripe each file image across based on at least one of: a type of the file, an application associated with the file, a desired availability level for the file, a desired performance level associated with accessing the file, and a cost associated with accessing the file;
selecting a group from the local storage pools to stripe each file image across based on at least one of: a workload associated with the local storage pools, available capacity of the local storage pools, relative computing power of the servers associated with each of the local storage pools, an access time of the servers associated with each of the local storage pools, a prediction of an application most likely to read or write to the file, a characteristic of the file, and a type of the file; and
striping the file image across the selected group.

15. The non-transitory computer-readable storage medium of claim 11, wherein the instructions when executed further cause the one or more processors to perform steps including:
receiving, from a requesting server, a request to read data from the file;
identifying, based on the file image map, the set of local storage pools storing the file images of the file;
selecting a target local storage pool from the set of local storage pools based on second optimization criteria;
reading the data from the file image stored on the target local storage pool;
updating metadata to record a read operation between the requesting server and the selected local storage pool.

16. The non-transitory computer-readable storage medium of claim 15, wherein selecting a target local storage pool from the set of local storage pools based on the second optimization criteria comprises:
selecting the targeting local storage pool based on at least one of: local accessibility to the requesting server of the local storage pools having the file image, a workload of the local storage pools having the file image, an access time to the file image associated with the local storage pools having the file image, a characteristic of the file, an application associated with the file, and a file type of the file.

17. The non-transitory computer-readable storage medium of claim 11, wherein the instructions when executed further cause the one or more processors to perform steps including:
receiving a request from a requesting server to write data to the file;
identifying, based on the file image map, the set of local storage pools storing the file images of the file;
writing the data to all respective local storage pool; and
updating metadata to record a write operation between the requesting server and each of the set of local storage pools having the file images for the file.

18. The non-transitory computer-readable storage medium of claim 11, wherein the instructions when executed further cause the one or more processors to perform steps including:
receiving a request from a requesting server to delete the file;
identifying, based on the file image map, the set of local storage pools storing the file images of the file;
deleting the file from all respective local storage pool; and
updating metadata to record a delete operation between the requesting server and each of the set of local storage pools having the file images for the file.

19. The non-transitory computer-readable storage medium of claim 11, wherein the instructions when executed further cause the one or more processors to perform steps including:
determining, for a file, a most requesting server requesting a largest number of access operations associated with the file over a predefined time period from among a first plurality of servers that do not store an image of the file in their local storage pool, wherein the access operations comprise at least one of read operation and write operations;

determining, for the file, a least requesting server requesting a smallest number of the access operations associated with the file over the predefined time period from among a second plurality of servers that store an image of the file in their local storage pool;

determining a difference value representing a difference between a first value and a second value, the first value representing a count of the access operation between the most requesting server and the file, and the second value representing a count of the access operations between the least requesting server and the file;

comparing the difference value to a threshold value; and responsive to the difference value exceeding the threshold value, moving the file image from a local storage pool of the least requesting server to a local storage pool of the most requesting server.

20. The computer-implemented method of claim 19, wherein the instructions when executed further cause the one or more processors to perform steps including:

generating a sorted list of a plurality of files based on respective difference values; and determining the threshold value based on at least one of a median value of the respective difference values, a mean value of the respective difference values, and a percentile of the respective difference values.

21. A system comprising:

a processor; and a non-transitory computer-readable storage medium storing instructions for shared storage service in a computing environment comprising a plurality of servers each having a local storage pool comprising one or more locally accessible storage devices, the local storage pools collectively forming a global storage pool available to the plurality of servers, the instructions when executed by one or more processors causing the one or more processors to perform steps including:

receiving from a first server, an instruction to create a file in the global storage pool for the plurality of servers;

determining a number of file images to create for the file in the global storage pool based on at least one of: a type of the file, an application associated with the file, a desired availability level for the file, a desired performance level associated with accessing the file, and a cost associated with accessing the file;

selecting a set of one or more local storage pools to store the file images, the set of one or more local storage pools selected based on first optimization criteria;

for each of the selected set of local storage pools, creating a file image for the file; and updating a file image map to store an association between the file and the selected set of one or more local storage pools that store the file images.

22. The system of claim 21, wherein selecting the set of one or more local storage pools based on the first optimization criteria comprises:

selecting the set of one or more local storage pools based on at least one of: a workload associated with the plurality of local storage pools, available capacity of the plurality of local storage pools, relative computing power of the servers associated with the plurality of local storage pools, an access time of the servers associated with the plurality of local storage pools, a prediction of an application most likely to read or write to the file, a characteristic of the file, and a type of the file.

* * * * *

UNITED STATES PATENT AND TRADEMARK OFFICE
CERTIFICATE OF CORRECTION

PATENT NO. : 9,613,050 B2  
APPLICATION NO. : 14/458057  
DATED : April 4, 2017  
INVENTOR(S) : Yoram Novick It is certified that error appears in the above-identified patent and that said Letters Patent is hereby corrected as shown below:

- At Column 10, Line 4, Claim 5 delete "local storage pool;" and add --local storage pool; and--
- At Column 10, Line 25, Claim 7 delete "respective local storage pool; and" and add --respective local storage pools; and--
- At Column 10, Line 55, Claim 9 delete "count of the access operation" and add --count of the access operations--
- At Column 12, Line 18-19, Claim 15 delete "local storage pool; updating" and add --local storage pool; and updating--
- At Column 12, Line 53, Claim 18 delete "respective local storage pool; and" and add --respective local storage pools; and--
- At Column 13, Line 8, Claim 19 delete "count of the access operation" and add --count of the access operations--

Signed and Sealed this  
Eighth Day of May, 2018

Andrei Iancu  
*Director of the United States Patent and Trademark Office*